(12) United States Patent
Kim (10) Patent No.: US 7,929,642 B2
(45) Date of Patent: Apr. 19, 2011

(54) CONTACTLESS INTEGRATED CIRCUIT CARD WITH REAL-TIME PROTOCOL SWITCHING FUNCTION AND CARD SYSTEM INCLUDING THE SAME

(75) Inventor: Ki-Yeol Kim, Kunpo-si (KR)

(73) Assignee: Samsung Electronics Co., Ltd.

( * ) Notice: Subject to any disclaimer, the term of this patent is extended or adjusted under 35 U.S.C. 154(b) by 1276 days.

(21) Appl. No.: 10/939,518

(22) Filed: Sep. 14, 2004

(65) Prior Publication Data
US 2005/0056704 A1 Mar. 17, 2005

(30) Foreign Application Priority Data
Sep. 15, 2003 (KR) .................. 10-2003-0063625

(51) Int. Cl.
*H04L 27/00* (2006.01)
(52) U.S. Cl. ........ 375/324; 375/220; 375/222; 375/340; 375/356
(58) Field of Classification Search .......... 375/340, 375/220, 222, 324, 356; 340/10.41; 235/379
See application file for complete search history.

(56) References Cited

U.S. PATENT DOCUMENTS

| | | | |
|---|---|---|---|
| 4,027,335 A | 5/1977 | Miller | |
| 4,612,508 A | 9/1986 | Rokutan | |
| 4,795,898 A * | 1/1989 | Bernstein et al. | 235/487 |
| 5,434,396 A | 7/1995 | Owen et al. | |
| 5,553,101 A * | 9/1996 | Lim et al. | 375/340 |
| 6,036,100 A | 3/2000 | Asami | |
| 6,151,647 A | 11/2000 | Sarat | |
| 6,161,762 A * | 12/2000 | Bashan et al. | 235/492 |
| 6,182,104 B1 * | 1/2001 | Foster et al. | 708/501 |
| 6,199,764 B1 * | 3/2001 | Tsai | 235/492 |
| 6,222,880 B1 | 4/2001 | Eastmond et al. | |
| 6,356,738 B1 | 3/2002 | Schneider et al. | |
| 2001/0049775 A1 | 12/2001 | Rechberger et al. | |
| 2003/0137404 A1 * | 7/2003 | Bonneau et al. | 340/10.41 |
| 2004/0213169 A1 | 10/2004 | Allard et al. | |

FOREIGN PATENT DOCUMENTS

| | | |
|---|---|---|
| EP | 0513507 | 11/1992 |
| FR | 2831305 | 4/2003 |
| JP | 06-276249 | 9/1994 |
| JP | 08-227444 | 9/1996 |
| JP | A-08-331623 | 12/1996 |
| JP | 2000-172806 | 6/2000 |
| JP | A-2002-033754 | 1/2002 |
| JP | A-2002-314625 | 10/2002 |
| KR | 2001-0042080 | 5/2001 |
| WO | WO 00/45328 | 8/2000 |
| WO | WO 03/036561 | 5/2003 |

OTHER PUBLICATIONS

French Patent Office Search Report dated Sep. 23, 2005.
Korean Patent Office Communication dated Jun. 29, 2005, for Korean Patent Application No. 10-2003-0063625.
German Patent Office Action dated May 7, 2008 for corresponding German Patent Application No. 10-2004-04-4836.1-53 which corresponds to Korean Patent Application No. 2003-63625.

\* cited by examiner

*Primary Examiner* — Shuwang Liu
*Assistant Examiner* — Kabir A Timory
(74) *Attorney, Agent, or Firm* — Harness, Dickey & Pierce, P.L.C.

(57) ABSTRACT

A contactless integrated circuit (IC) card can include: an analog interface block operable to demodulate a received radio frequency (RF) signal into multiple versions thereof according to a first plurality of communication protocols, respectively; a controller operable to select from among a second plurality of communication protocols; and a universal asynchronous receiver/transmitter (UART) operable to select one of the demodulated versions of the RF signal according to the selected protocol.

25 Claims, 6 Drawing Sheets

CONTACTLESS INTEGRATED CIRCUIT CARD WITH REAL-TIME PROTOCOL SWITCHING FUNCTION AND CARD SYSTEM INCLUDING THE SAME

CROSS-REFERENCE TO RELATED APPLICATIONS

This U.S. non-provisional patent application claims priority under 35 U.S.C. §119 of Korean Patent Application 2003-63625 filed on Sep. 15, 2003, the entire contents of which are hereby incorporated by reference.

BACKGROUND OF THE PRESENT INVENTION

Data transmission systems are well known and widely used to exchange information and conduct transactions with remotely positioned portable data devices. Such portable data devices are commonly referred to as cards, smart cards, or tags. Likewise, data transmission terminals are commonly referred to as card readers. In such a data transmission system, a transaction begins when a card enters the excitation field of the terminal/reader. In particular, the terminal produces a power signal as well as a data signal (also referred to as an information signal) and transmits the information signal using a carrier signal. It is the detection and reception of the carrier signal that remotely powers the card, and enables the card circuitry to perform its intended function.

Remotely powered (i.e., contactless) data devices (i.e., cards) can be used to perform a variety of tasks, including theft prevention, personnel or material identification and control, automatic fare collection, money and service transaction recording and control, and the like. While ID tags may be less complex, so-called smart cards tend to be more complex and may include one or more processors, as well as local memory to store and process information. A particular variety of the contactless IC cards (or contactless smart cards) is known as a vicinity card and uses a communication protocol called the ISO/IEC 14443 standard. Physical characteristics of a vicinity IC card, its radio frequency (RF) power and signal interface, and its initialization and anti-collision and transmission protocol are defined in ISO/IEC 14443. Specifically, two communication signal interfaces, referred to as type-A and type-B, are described in ISO/IEC 14443.

In the type-A interface, interfacing between a card reader (or a terminal) and an IC card is performed using the technique of amplitude phase-shift keying (ASK) 100% modulation of the RF operating field, and data to be transmitted are coded in the format of a modified miller code. In the type-B interface, interfacing between a card reader (or a terminal) and an IC card is performed using ASK 10% modulation and data to be transmitted are coded in a format of NRZ-L non-return-to-zero level (NRZ-L) code. Since the type-A and type-B interfaces are described in detail in ISO/IEC 14443, a detailed description about them will be omitted.

IC cards according to the Background Art support either the type-A or type-B interface. As described above, since the type-A and type-B coding and modulation are different from each other, an IC card supporting one of the communication signal interfaces can be used only in a card reader supporting the corresponding communication signal interface. If a card reader supports the type-A communication protocol, it is impossible to use with it an IC card supporting only the type-B interface, and vice-versa.

SUMMARY OF THE PRESENT INVENTION

At least one embodiment of the present invention provides a contactless IC card capable of improving the compatibility by switching (e.g., adaptively) communication signal interfaces according to inputted RF signals in real time.

At least one embodiment of the present invention provides a contactless integrated circuit (IC) card. Such an contactless IC can include: an analog interface block operable to demodulate a received radio frequency (RF) signal into multiple versions thereof according to a first plurality of communication protocols, respectively; a controller operable to select from among a second plurality of communications protocols; and a universal asynchronous receiver/transmitter (UART) operable to select one of the demodulated versions of the RF signal according to the selected protocol Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PRESENT INVENTION

Reference will now be made in detail to the example embodiments of the present invention, which are illustrated in the accompanying drawings. However, the present invention is not limited to the example embodiments illustrated herein after, and the example embodiments herein are rather introduced to provide easy and complete understanding of the scope and spirit of the present invention. The terms "communication signal interface" and "communication protocol" will be used interchangeably.

In developing embodiments of the present invention, the following problem with the Background Art was recognized and a path to a solution identified. As noted, the Background Art vicinity-type IC cards support either the type-A or the type-B interface, but not both, which is a problem when attempting to use an IC card of one interface type with a card reader of the other type interface. Such a problem can be avoided by providing an IC card and/or a card reader that is/are compatible with both type-A and type-B interfaces.

Figure 1:
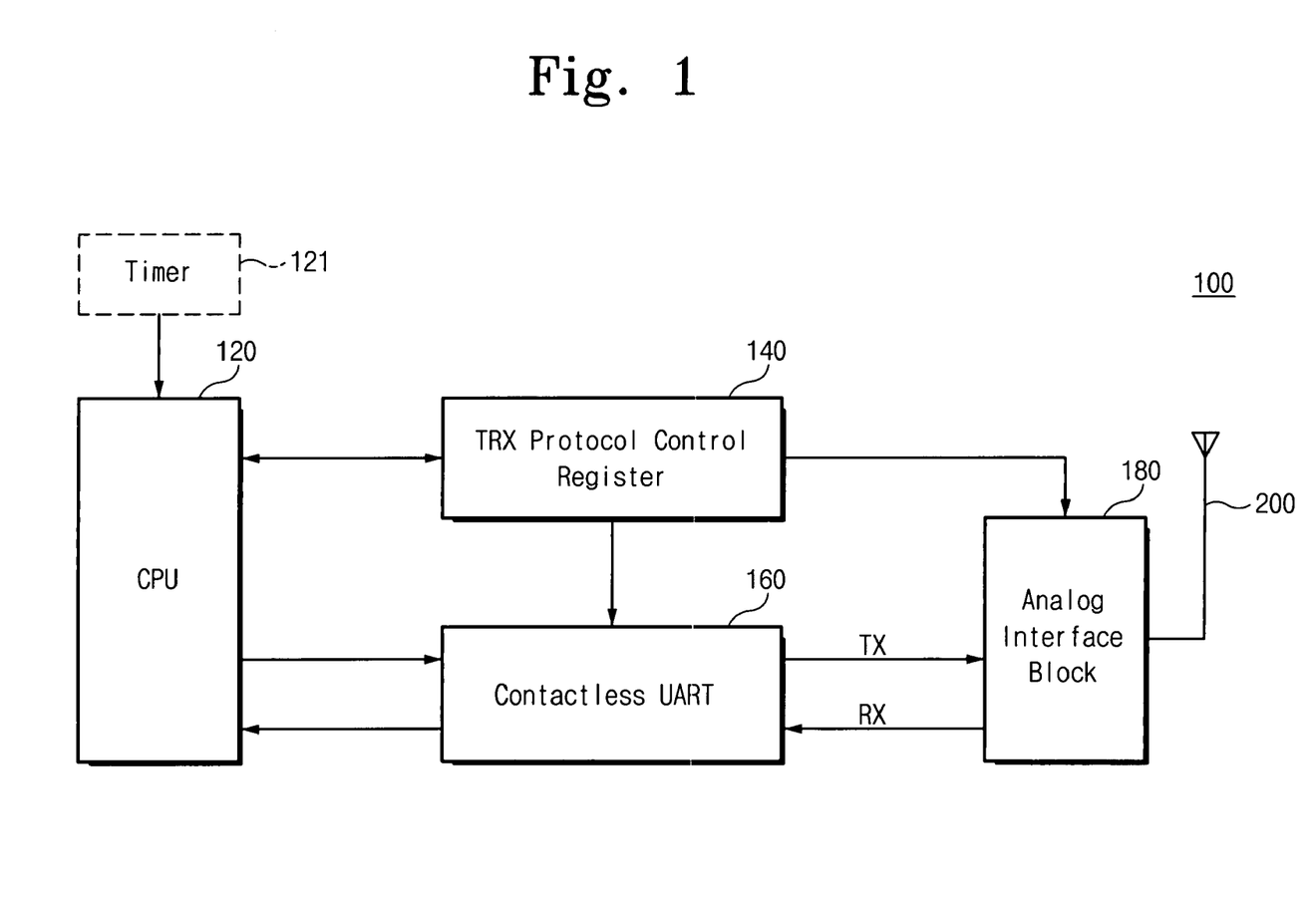
FIG. 1 is a schematic block diagram of a contactless IC card, according to at least one embodiment of the present invention.

FIG. 1 is a schematic block diagram of a contactless IC card, according to at least one embodiment of the present invention. Referring to FIG. 1, a contactless IC card 100 includes: a central processing unit 120 with an operating system (hereafter, CPU 120); a transmission/reception (TRX) protocol control register 140; a contactless universal asynchronous receiver/transmitter (UART) 160; and an analog interface block 180.

To transmit/receive an RF signal, the type of communication signal interface is set in the register 140, e.g., initially by an operating program of the contactless IC card 100. Once register 140 is set, the UART 160 and the analog interface block 180 operate accordingly. The TRX protocol control register 140 controls a protocol transfer rate, an error verification method, UART start and end transmission/reception notification, and the like. The UART 160 codes data (from the CPU 120 that are to be transmitted), according to the particular communication signal interface that has been set in the register 140 (hereafter, the selected interface type), and outputs the coded data to the analog interface block 180, e.g., one bit by one bit. The analog interface block 180 modulates the data outputted from the UART 160 according to the selected interface type and then outputs the modulated data through an antenna 200. Correspondingly, the analog interface block 180 demodulates an RF signal received via the antenna 200 according to the selected interface type, and the UART 160 temporarily stores an output of the analog interface block 180 according to the selected interface type. The stored data are transmitted to the CPU 120.

Figure 2:
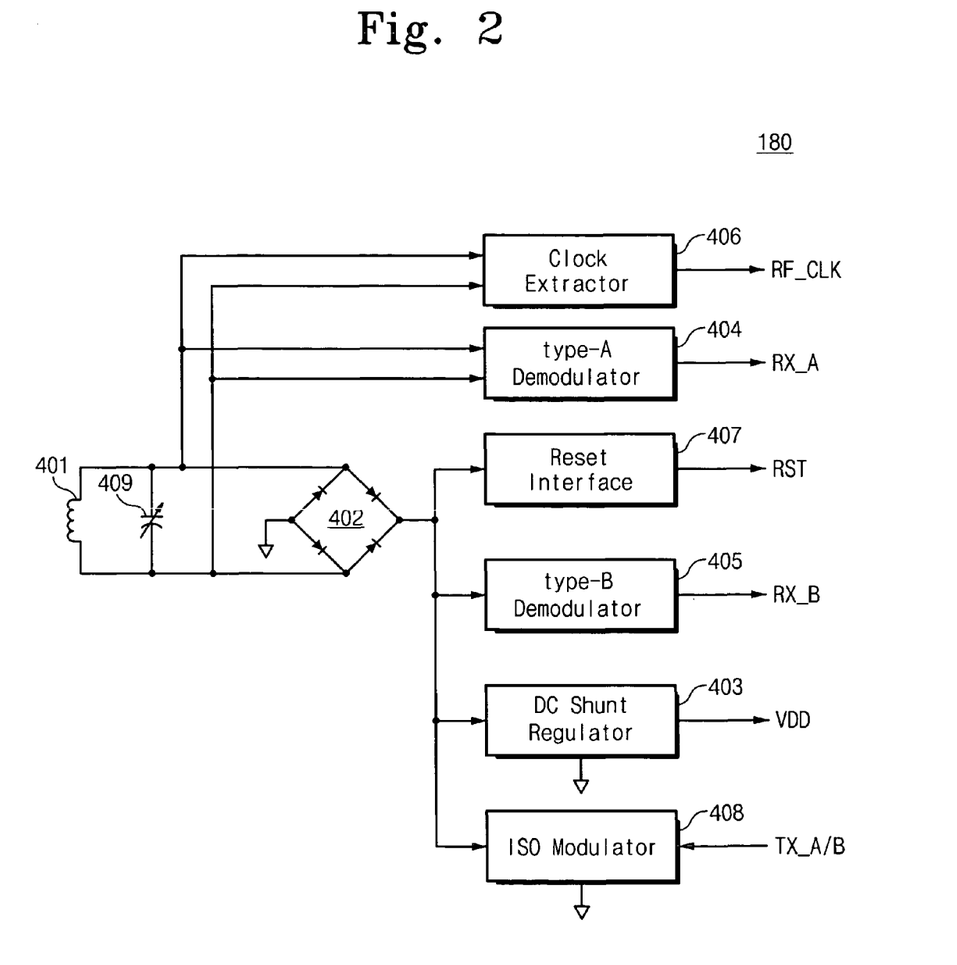
FIG. 2 is a block diagram of an analog interface block of FIG. 1, according to at least one embodiment of the present invention.

FIG. 2 is a more-detailed block diagram of the analog interface block 180 of FIG. 1, according to at least one embodiment of the present invention. Referring to FIG. 2, the analog interface block 180 includes: a coil 401; a variable capacitance 409, a rectifier 402; a DC shunt regulator 403; a type-B demodulator 405; a reset interface 407; a type-A demodulator 404; a clock extractor 406; and an ISO modulator 408. The rectifier 402 converts an AC signal into a DC voltage and is electronically connected to a coil 401. Based on the DC voltage outputted from the rectifier 402, a DC shunt regulator 403 generates a power supply voltage VDD necessary when driving internal circuits of the IC card 100. A type-A (ASK 100% modulation) demodulator 404 demodulates reception information contained in AC signal received through the coil 401, and a type-B (ASK 10% modulation) demodulator 405 demodulates reception information contained in an output of the rectifier 402.

Figure 3:
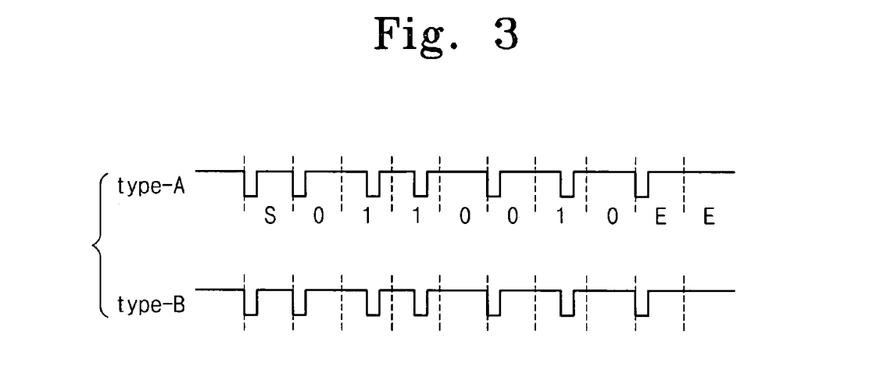
FIG. 3 illustrates a signal demodulated by demodulator circuits of FIG. 2 in a type-A communication, according to at least one embodiment of the present invention.
Figure 4:
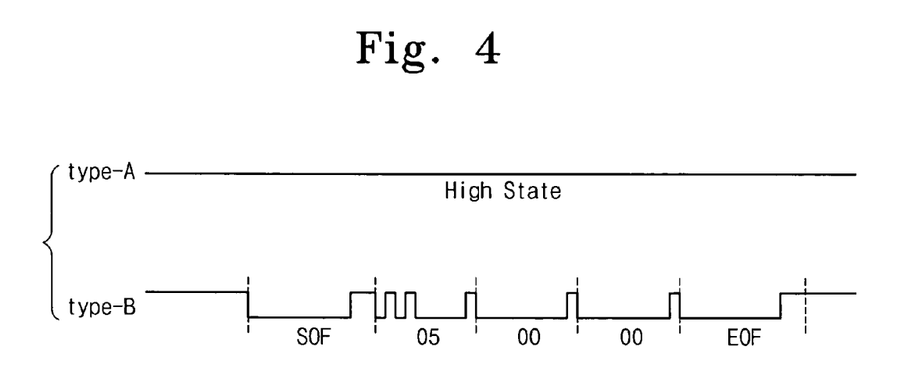
FIG. 4 illustrates a signal demodulated by demodulator circuits of FIG. 2 in a type-B communication, according to at least one embodiment of the present invention.

FIG. 3 illustrates signals demodulated by the demodulators 404 and 405 when RF signals are received from a card reader having a type-A interface according to at least one embodiment of the present invention. FIG. 4 illustrates signals demodulated by the demodulators 404 and 405 when RF signals are received from a card reader having a type-B interface, according to at least one embodiment of the present invention. As can be seen in FIG. 3, when RF signals are received from the card reader having the type-A interface, the signals demodulated by the demodulators 404 and 405 have the same waveforms. As can be seen from FIG. 4, when RF signals are received from the card reader having the type-B interface, the signal demodulated by the demodulator 404 maintains a constant level while the signal demodulated by the demodulator 405 has a demodulated waveform that is characteristic of the type-B interface.

Referring again to FIG. 2, the clock extractor 406 is configured to extract a clock signal RF_CLK from the AC signal received through the coil 401, and the reset interface 407 is configured to generate a reset signal RST based on the output of the rectifier 402. The ISO modulator 408 modulates data TX_A/B outputted from the UART 160 according to the selected interface type.

Figure 5:
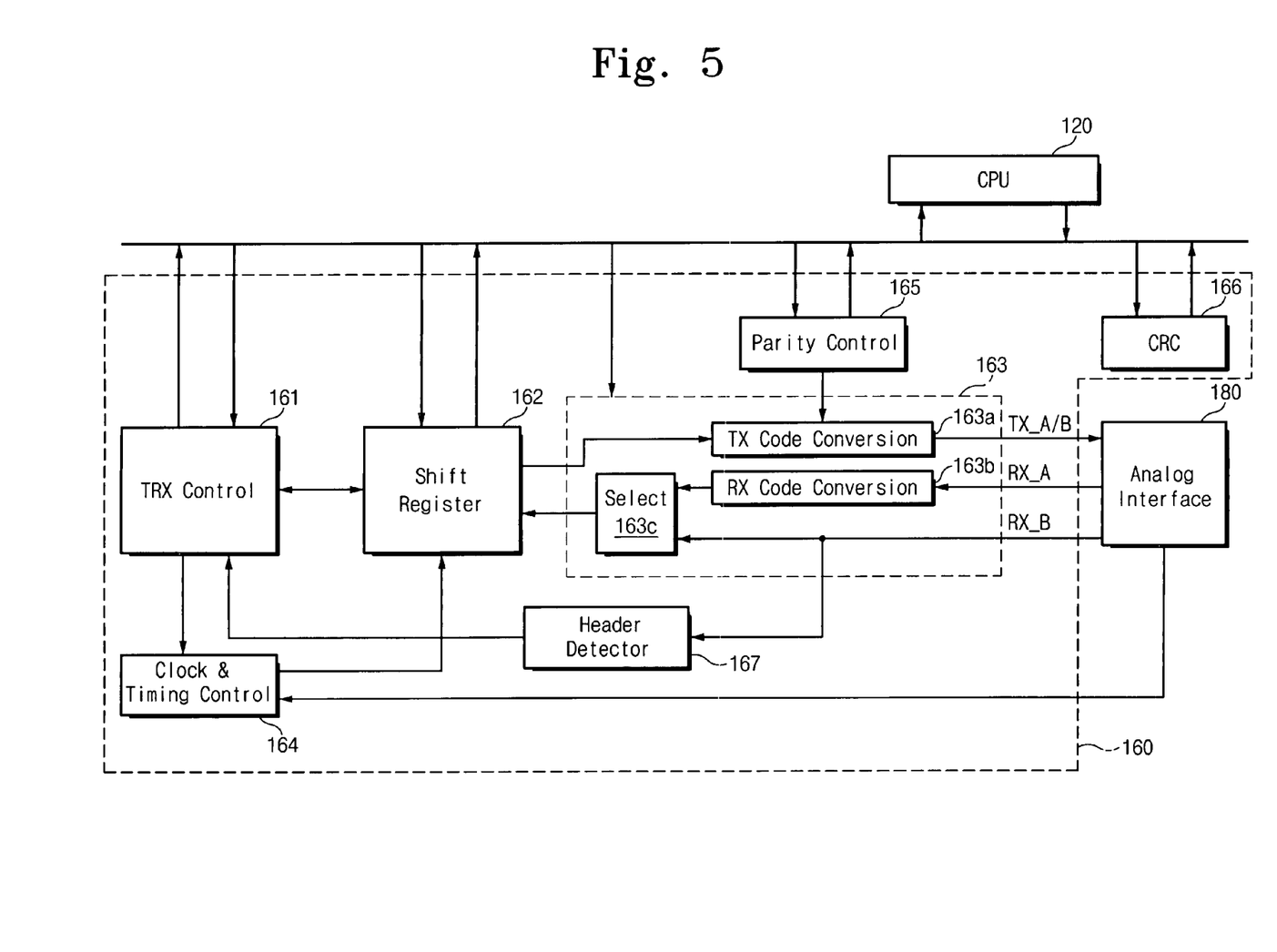
FIG. 5 is more-detailed block diagram of a universal asynchronous receiver/transmitter of FIG. 1, according to at least one embodiment of the present invention.

FIG. 5 is a more-detailed block diagram of the universal asynchronous receiver/transmitter (again UART 160 of FIG. 1, according to at least one embodiment of the present invention. The UART 160 includes: a transmission/reception (again, TRX) control block 161; a shift register 162; a code conversion block 163; a timing and control block 164; a parity control block 165; a CRC block 166; and a header detection block 167.

Referring to FIG. 5, the CPU 120 transmits control signals relating to protocol setup and UART driving, transmission/reception mode, transmission/reception rate, error handling method, protocol implementation option, transmission/reception end control, and the like, to the TRX control block 161. The TRX control block 161 controls a flow of UART operation. Transmission data are shifted out of the shift register 162, e.g., out of the LSB position, e.g., one bit by one bit, e.g., periodically, and then transmitted to a transmission code conversion block 163a. The transmission code conversion block 163a converts the inputted transmission data into code data according to the selected interface type. The code data converted in this manner are modulated by the analog interface block 180 and the modulated signals are transmitted to the card reader or the terminal through the antenna 200. If the type-A communication signal interface is selected, then the transmission code conversion block 163a adds parity information, obtained from the parity control block 165, to the data outputted from the shift register 162.

The RF signal received via the antenna 200 is individually demodulated through the demodulators 404 and 405 of the analog interface block 180 (resulting in multiple demodulated versions of the RF signal), and then the demodulated signals are transmitted to the code conversion block 163. Modified mirror code signals demodulated by the demodulator 404 are converted into NRZ-L codes by a reception code conversion block 163b. A selector 163c selectively outputs an output of the reception code conversion block 163b and the signal demodulated by the demodulator 405, according to the selected interface. The data outputted from the code conversation block 163 are inputted to the shift register 162, e.g., at the LSB position, e.g., one bit by one bit. If the shift register becomes filled, e.g., with data representing a one-byte unit, then the data stored in the shift register 162 is transmitted to the CPU 120. For example, if the shift register 162 becomes completely filled, then the TRX control block 161 outputs an interrupt signal to the CPU 120, and then, the CPU 120 takes the data stored in the shift register 162 in response to the interrupt signal.

A control and timing control block 164 receives a clock from the analog interface block 180 and generates a clock for the UART 160 under the control of the TRX control block 161. If the type-A interface is selected, then the parity control block 165 determines whether or not there is a parity error in a reception operation, and then, generates parity information regarding the transmission data during a transmission operation. The cyclic redundancy checking (again, CRC) block 166 is configured to determine whether or not there is an error within the transmitted data. The header detection block 167 receives the signals demodulated by the analog interface block 180 and detects header information (for example, SOF information in case of the type-B interface) of a current input signal. The TRX control block 161 controls the shift register 162 according to the detected result of the header detection block 167.

If the contactless IC card 100 is set to the type-A of the communication signal interface, then the contactless IC card 100 can communicate with only a card reader having the type-A of the communication signal interface, and vice versa. In other words, despite having the capability to work with either interface, the contactless IC card 100 will only work with one or the other of the interfaces unless a change is made to the setting in register 140. Accordingly an alternative arrangement of contactless IC card 100 includes an optional toggle capability to switch the communication signal interface set in register 140 between type-A and type-B, e.g., periodically. With such a toggling capability, it is possible to communicate with a card reader having the type-B interface, as well as a card reader having the type-A interface. Such switching capability can be provided using additional, e.g., hardware (for example, a timer 121 indicated as being optional via the use of dashed lines) or software (for example, running on CPU 120), etc.

Figure 6:
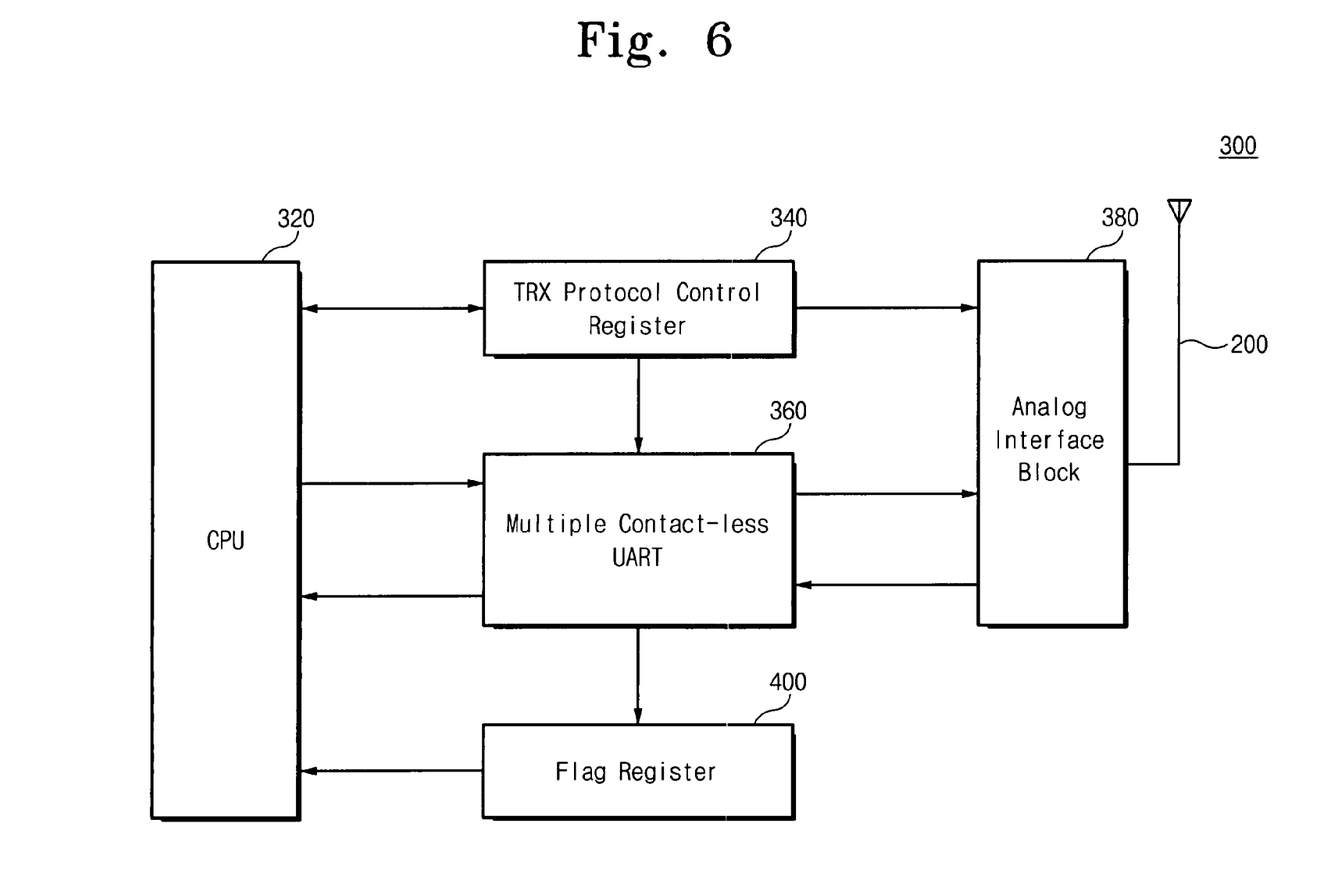
FIG. 6 is a schematic block diagram of a contactless IC card, according to at least one other embodiment of the present invention.

FIG. 6 is a schematic block diagram of a contactless IC card according to at least one other embodiment of the present invention. Referring to FIG. 6, the contactless IC card 300 includes: a central processing unit 320 with an operating system (hereafter, CPU 360); a transmission/reception (again, TRX) protocol control register 340; a universal asynchronous receiver/transmitter (again, UART 360; an analog interface block 380; and a flag register 400.

The contactless IC card 300 performs the following processes before setting a communication signal interface. First, the contactless IC card is set to a reception mode under the control of the CPU 320 in order to receive RF signals of either type-A and type-B. Then, a basic option of the UART 360 is set and the UART 360 is driven. This condition is a communication ready state between the contactless IC card and a card reader whose communication signal interface is not known. When a card reader transmits an RF signal, the received RF signal is demodulated through the analog interface block 380 individually according to both the type-A and type-B interface (resulting in multiple demodulated versions of the RF signal), and the first and second demodulated signals are transmitted to the UART 360.

The UART 360 determines the interface type according to which the RF signal is compliant based upon at least one of the demodulated signals and transmits the identified type to the flag register 400. Finally, the CPU 320 sets values in the register 340 according to the value stored in the flag register 400 corresponding to the identified type.

Thereafter, the contactless IC card 300 communicates with a terminal according to the identified interface type. If RF signals of the other communication signal interface are received, the UART 360 adaptively changes the value stored in the flag register 400 and then the CPU 320 adaptively switches the communication signal interface according to the changed value.

In the contactless IC card 300, the analog interface block 380 of FIG. 6 is configured with a structure substantially identical to that of FIG. 2. Therefore, its detailed description will be omitted.

Figure 7:
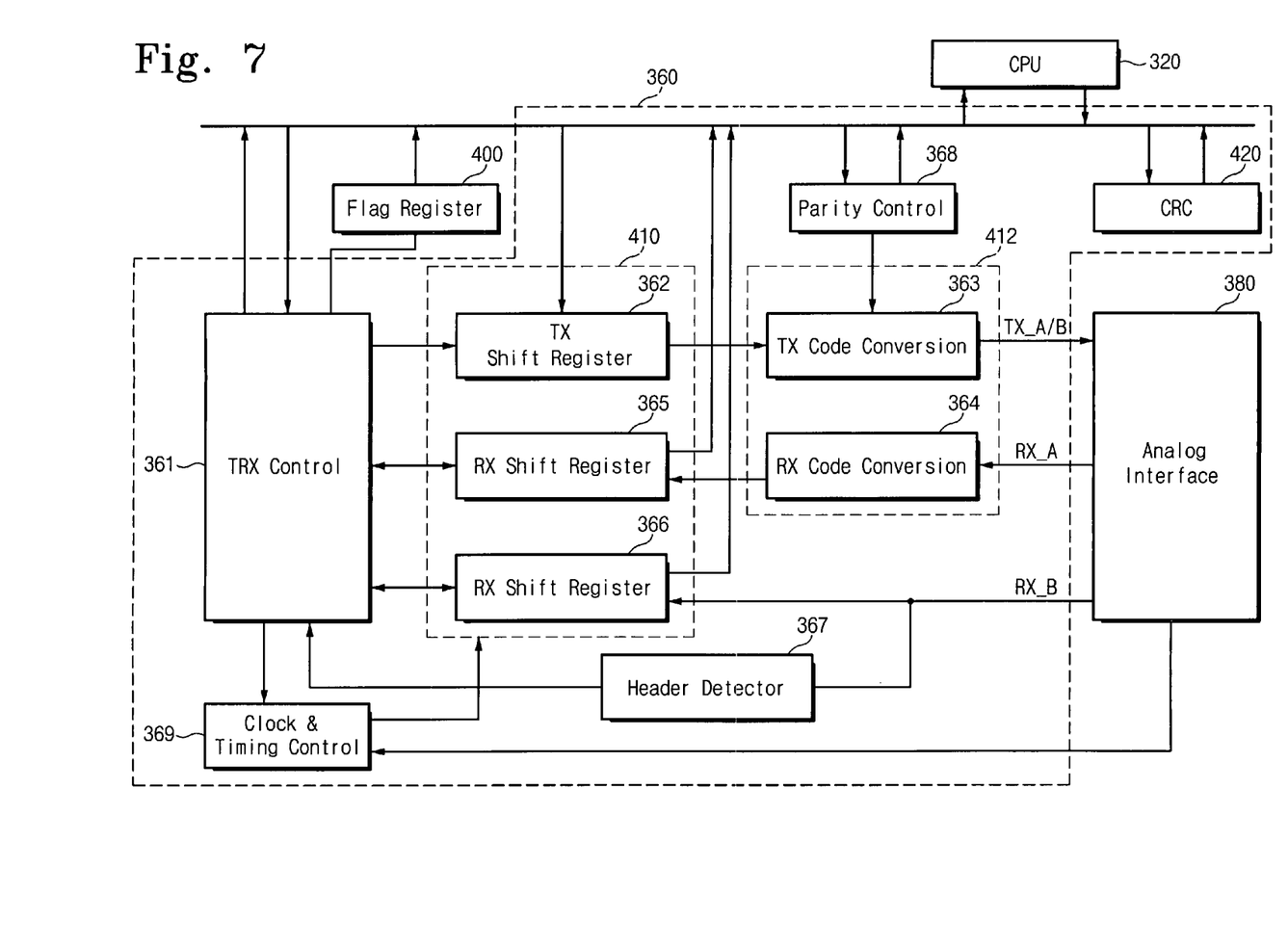
FIG. 7 is a more-detailed block diagram of a universal asynchronous receiver/transmitter of FIG. 6, according to at least one other embodiment of the present invention.

FIG. 7 is a more-detailed block diagram of the UART of FIG. 6, according to at least one other embodiment of the present invention. The UART 360 includes: a transmission/reception (TRX) control block 361; a block 410 of shift registers; a block 412 of code converters; a header detector 367; a parity control block and a CRC block 420.

Referring to FIG. 7, the transmission data are shifted out of the transmission shift register 362, e.g., out of the LSB position, e.g., periodically, e.g., bit-by-bit, under the control of the TRX control block 361 and transmitted to a transmission code conversion block 363 in the block 412. The transmission code conversion block 363 converts the transmission data into code data according to the selected interface type. The converted code data are modulated through an ISO modulator 408 of the analog interface block 380 (again, see FIG. 2), and the modulated signals are transmitted to the card reader or the terminal through the antenna 200.

The signals received by the contactless IC card 300 via the antenna 200 are individually demodulated into codes of type-A and type-B via the demodulators 404 and 405 of the analog interface block 380 (again, see FIG. 2). The signals demodulated by the demodulator 404 are converted into NRZ-L code data via reception code conversion block 364 of block 412 and the converted data are outputted to a type-A interface of block 410 shift register 365. The signals demodulated by the demodulator 405 are outputted to a type-B interface shift register 366 without any code conversion. The header detection block 367 detects whether or not SOF information is contained in a header portion of the signal demodulated by the demodulator 404. The TRX control block 361 sets a value of the flag register 400 according to the detected result.

A parity control block 368 determines whether or not there is a parity error when the contactless IC card is set to the type-A of the interface, and generates parity information regarding the transmission data in a transmission operation. A clock and timing control block 369 receives a clock from the analog interface block 380 and generates a clock for the UART 360. A CRC block 420 is configured to check whether or not there is an error within the transmitted data.

Unlike the contactless IC card 100, the contactless IC card 300 does not communicate with the card reader according to a previously selected interface stored in the register 340 but communicates with the card reader after analyzing the RF signals transmitted from the card reader in real time and adaptively setting the interface type in the register 340 according to the analyzed result. The selected interface type is switched in real time to match that of the card reader.

For example, in the type-A communication, the card reader transmits a short frame signal as a REQA command (26H or 0110010B) to the contactless IC card 300. Each of the demodulators 404 and 405 of the analog interface block 380 demodulates the inputted short frame signal. As described above (see FIGS. 3-4), if the RF signals of type-A are received, then the signals demodulated individually by the demodulators 404 and 405 have the same waveforms. The signals demodulated by the demodulator 404 are converted from modified mirror codes to NRZ-L codes through the code conversion block 364. At the same time, the header detection block 367 detects whether or not SOF information is contained in a header portion of the signal demodulated by the demodulator 405. In the type-A communication, the TRX control block 361 will recognize that SOF information is not contained in the header portion of the demodulated signal and accordingly sets a value in the flag register 400, and then transmits an interrupt signal to the CPU 320. The CPU 320 correspondingly sets values in the register 340 based upon the contents of the flag register 400, and then the UART 360 and the analog interface block 380 operate according to the type-A interface. Thereafter, the contactless IC card 300 communicates with the card reader using the type-A interface.

On the other hand, in the type-B communication, the card reader transmits a frame signal as a REQB command (050000H) to the contactless IC card 300. Each of the demodulators 404 and 405 of the analog interface block 380 demodulates the inputted short frame signal. As described above (again, see FIGS. 3-4), when the RF signals of type-B are received, the signal demodulated by the demodulator 404 maintains a constant level while the signal demodulated by the demodulator 405 has a waveform shown in FIG. 4. Since the signal demodulated by the demodulator 405 has a NRZ-L code format, the demodulated signal is transmitted to the type-B reception shift register 366 without any code conversion. At the same time, the header detection block 367 detects whether or not SOF information is contained in a header portion of the signal demodulated by the demodulator 405. The TRX control block 361 sets a value of the flag register 400 according to the detected result of the header detection block 367 and transmits an interrupt signal to the CPU 320.

In the type-B communication, the TRX control block 361 will recognize that SOF information is contained in the header portion of the signal demodulated by the demodulator 405, and then the TRX control block 361 will set a corresponding value in the flag register 400 and send an interrupt signal to the CPU 320. The CPU 320 correspondingly sets values in the register 340 based upon the contents of the flag register 400, and then the UART 360 and the analog interface block 380 operate according to the type-B interface. Thereafter, the contactless IC card 300 communicates with the card reader using the type-B interface. After the setting of the communication signal interface, blocks related to an unselected communication signal interface can be set to a suspend mode in order to reduce power consumption. For example, this can be achieved by selectively controlling the clocks generated by the clock and timing control block 369. Alternatively, it is possible to reduce power consumption by controlling the components of the analog interface block 380 (for example, the demodulators) according to the selected interface.

The above description the contactless IC cards 100 and 300 in terms of the type-A and type-B interface operation is one example of the how the present invention can be embodied. However, by appropriately configuring the analog interface block 180/380, such a contactless IC card can also communicate in real time with a card reader having a communication signal interface other than or in addition to the type-A and type-B interfaces, and accordingly configuring the UART 160/360, etc. In FIGS 6 and 7, it should be apparent to those skilled in the art that the flag register 400 alternatively can be contained in the UART 360 or the TRX control block 361.

As described above, the contactless IC card 300 can communicate with card readers using various communication protocols by analyzing the communication protocol being used and adaptively setting the register 340 accordingly, all in real time.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A contactless integrated circuit card comprising:
    an analog interface block configured to demodulate a received radio frequency (RF) signal into multiple versions thereof according to a first plurality of communication protocols;
    a controller configured to select a protocol based on analysis of at least one of the multiple versions of the demodulated RF signal; and
    a universal asynchronous receiver/transmitter (UART) configured to select one of the demodulated versions of the RF signal according to the selected protocol, wherein the UART includes reception shift registers corresponding to the demodulated versions of the RF signal,
    the controller is further operable to control the analog interface block according to the selected protocol, and the UART further includes,
        a transmission shift register operable to store data to be transmitted, and
        a code conversion block operable to convert data that was shifted out of the transmission shift register into code data of a type corresponding to the selected protocol, and outputting the converted code data to the analog interface block.

2. The contactless integrated circuit card of claim 1, wherein the communication protocols include type-A and type-B communication protocols contained in ISO 14443.

3. The contactless integrated circuit card of claim 2, wherein the analog interface block includes:
    a first demodulator operable to demodulate the received RF signal according to the type-A communication protocol; and
    a second demodulator operable to demodulate the received RF signal according to the type-B communication protocol.

4. The contactless integrated circuit card of claim 3, wherein the UART includes first and second reception shift registers respectively corresponding to the signals demodulated by the first and second demodulators.

5. The contactless integrated circuit card of claim 1, wherein the controller is further operable to periodically re-select the protocol on an alternating basis from among the second plurality of protocols.

6. The contactless integrated circuit card of claim 1, wherein:
    the UART is further configured to
        determine a communication protocol being used by the RF signal based upon at least one of the demodulated versions of the RF signal, and
        output an indication of the determined protocol; and
    the controller is further configured to
        set the selected protocol according to the determined protocol, and
        also control the analog interface block according to the selected protocol.

7. The contactless integrated circuit card of claim 1, wherein the second plurality of communication protocols is the same as the first plurality of communication protocols.

8. The contactless integrated circuit card of claim 1, wherein
    the UART further includes a header detection block configured to detect header information of at least one of the demodulated versions of the RF signal,
    the UART further includes a transmission control block configured to control the transmission shift register according to a result of the detected header information, and
    the controller is configured to select the protocol from among a second plurality of communication protocols based on the result of the detected header information.

9. A contactless integrated circuit card configured to communicate with a card reader through a contactless interface, the contactless integrated circuit card comprising:

a first demodulation block configured to demodulate a received radio frequency (RF) signal into a first demodulated signal according to a first communication protocol;
a code conversion block configured to convert the first demodulated signal into code data;
a first shift register configured to store the code data;
a second demodulation block configured to demodulate the received RF signal into a second demodulated signal according to a second communication protocol;
a second shift register configured to store the second demodulated signal;
a header detector configured to determine a communication protocol of the received RF signal based upon the second demodulated signal;
a control block configured to
select a communication protocol of the contactless integrated circuit card according to the protocol of the RF signal determined by the header detector, and
pick one of an output of the first shift register and an output of the second shift register according to the selected protocol;
a transmission shift register configured to store data to be transmitted;
a code conversion block configured to convert data stored in the transmission shift register into code data according to the selected protocol; and
a modulation block configured to modulate the code data according to the set communication protocol.

10. The contactless integrated circuit card of claim 9, wherein the first demodulation block is configured to demodulate an ASK 100% modulation signal and the second demodulation block is configured to demodulate an ASK 10% modulation signal.

11. The contactless integrated circuit card of claim 10, wherein the header detector is configured to determine whether or not Start of Frame (SOF) information is contained in the second demodulated signal.

12. A contactless integrated circuit card comprising:
a first demodulation block for demodulating a received radio frequency (RF) signal into a first demodulated signal according to a first communication protocol;
a code conversion block for converting the first demodulated signal into code data;
a first shift register for storing the code data;
a second demodulation block for demodulating the received RF signal into a second demodulated signal according to a second communication protocol;
a second shift register for storing the second demodulated signal;
a header detector for determining a communication protocol of the RF signal based upon the second demodulated signal;
a flag register for storing a flag;
a transmission/reception (TRX) control block for setting a value of the flag in the flag register to indicate the protocol determined by the header detector;
a central processing unit for
selecting a communication protocol of the contactless integrated circuit card according to the flag signal, and
causing operation upon one of an output of the first shift register and an output of the second shift register according to the selected protocol;
a transmission shift register for storing data to be transmitted;
a code conversion block for converting the data stored in the transmission shift register into code data according to the selected protocol; and
a modulation block for modulating the converted code data according to the selected protocol.

13. The contactless integrated circuit card of claim 12, wherein the header detector determines whether or not Start of Frame (SOF) information is contained in the second demodulated signal.

14. The contactless integrated circuit card of claim 12, wherein the TRX control block controls only one of the first and second shift registers so as to operate according to the communication protocol set by the central processing unit.

15. A method for switching a communication protocol of a contactless integrated circuit card configured to communicate with a card reader through a contactless interface, the method comprising:
demodulating a radio frequency (RF) signal received by the contactless integrated circuit card into a multiple versions thereof according to a plurality of communication protocols;
selecting a communication protocol of the contactless integrated circuit card from among the plurality of protocols based on analysis of at least one of the multiple versions of the demodulated RF signal;
causing operation by the contactless integrated circuit card upon one of the multiple demodulated versions according to the selected protocol;
storing data to be transmitted in a shift register;
converting the data stored in the shift register into code data according to the selected protocol; and
modulating and then transmitting the converted code data according to the selected protocol.

16. The method of claim 15, further comprising:
converting at least one of the demodulated versions into code data; and
storing the code data in a first shift register and the remaining demodulated versions in a second shift register.

17. The method of claim 15, wherein the communication protocols include type-A and type-B communication protocols contained in ISO 14443.

18. The method of claim 17, wherein the received RF signal is respectively demodulated according to the type-A and type-B communication protocols to produce the multiple demodulated versions of the RF signal.

19. The method of claim 18, further comprising:
converting the type-A demodulated version into the code data corresponding to the type-A protocol; and
storing the code data in the first shift register;
wherein the type-B demodulated version is stored in the second shift register without any code conversion process.

20. The method of claim 15, further comprising:
determining a communication protocol for the RF signal based upon at least one of the demodulated versions of the RF signal;
wherein the step of selecting a communication protocol includes
setting the determined protocol of the RF signal as the selected protocol.

21. A contactless integrated circuit card comprising:
a first demodulation block for demodulating a received radio frequency (RF) signal into a first demodulated signal according to a first communication protocol;
a code conversion block for converting the first demodulated signal into code data;
a second demodulation block for demodulating the received RF signal into a second demodulated signal according to a second communication protocol;

a selection block for selecting one of the code data and the second demodulated signal in response to a protocol selection signal;

a shift register for storing the signal selected by the selection block;

a header detector for determining a communication protocol of the received RF signal in response to detecting header information of the second demodulated signal; and a controller for generating the protocol selection signal so as to cause the selection block to periodically alternate between selection of the code data and the second demodulated signal based on a determination by the header detector, wherein the controller controls an analog interface block including the first and second demodulation blocks and controls the shift register according to the determination by the header detector, the shift register stores data to be transmitted, and the code conversion block converts data that was shifted out of the shift register into code data of a type based on the determination by the header detector, and outputting the converted code data to the analog interface block.

22. The contactless integrated circuit card of claim 21, wherein the first demodulation block is configured to demodulate an ASK 100% modulation signal and the second demodulation block is configured to demodulate an ASK 10% modulation signal.

23. The contactless integrated circuit card of claim 21, wherein the header detector determines whether or not Start of Frame (SOF) information is contained in the second demodulated signal.

24. The contactless integrated circuit card of claim 21, further comprising:

a transmission shift register for storing data to be transmitted;

a code conversion block for converting the data stored in the transmission shift register into code data according to the selected protocol; and a modulation block for modulating the code data according to the selected protocol.

25. The contactless integrated circuit card of claim 21, further comprising:

a header detector for determining a communication protocol of the RF signal based upon the second demodulated signal;

wherein the controller also at least temporarily stops the periodic alternating selection so that the selection block is caused to select the protocol that corresponds to the protocol of the RF signal.

* * * * *